United States Patent
Patterson

(10) Patent No.: US 8,162,340 B2
(45) Date of Patent: Apr. 24, 2012

(54) SPIRAL ROTOR CHAIN SHIFTING SYSTEM

(75) Inventor: Sam Patterson, DeLeon Springs, FL (US)

(73) Assignee: Sam Patterson, DeLeon Springs, FL (US)

( * ) Notice: Subject to any disclaimer, the term of this patent is extended or adjusted under 35 U.S.C. 154(b) by 267 days.

(21) Appl. No.: 12/649,660

(22) Filed: Dec. 30, 2009

(65) Prior Publication Data

US 2011/0079982 A1    Apr. 7, 2011

Related U.S. Application Data

(60) Provisional application No. 61/142,018, filed on Dec. 31, 2008.

(51) Int. Cl.
*B62M 1/02* (2006.01)
(52) U.S. Cl. ........................... 280/261; 474/144
(58) Field of Classification Search ............... 280/261; 474/144, 152, 164
See application file for complete search history.

(56) References Cited

U.S. PATENT DOCUMENTS

| | | | |
|---|---|---|---|
| 1,395,067 A | 10/1921 | Warren | |
| 2,189,220 A | 2/1940 | Osborne | |
| 3,893,206 A | 7/1975 | Pickles et al. | |
| 3,965,763 A * | 6/1976 | Wechsler | 474/81 |
| 4,201,095 A * | 5/1980 | Cirami | 474/81 |
| 4,303,255 A | 12/1981 | Thomas | |
| 4,369,674 A | 1/1983 | Hamane et al. | |
| 4,530,678 A * | 7/1985 | Wechsler | 474/81 |
| 4,610,644 A | 9/1986 | Nagano | |
| 4,854,191 A | 8/1989 | Nagano | |
| 5,273,500 A | 12/1993 | Nagano | |
| 5,303,942 A | 4/1994 | Schlumpf | |
| 5,445,567 A | 8/1995 | Chattin | |
| 5,496,049 A | 3/1996 | Escobedo | |
| 5,609,071 A | 3/1997 | Schlumpf | |
| 5,620,384 A | 4/1997 | Kojima | |
| 5,865,062 A * | 2/1999 | Lahat | 74/473.12 |
| 5,887,318 A | 3/1999 | Nicoletti | |
| 5,895,336 A | 4/1999 | Yoo | |
| 5,961,409 A | 10/1999 | Ando | |
| 6,029,990 A | 2/2000 | Busby | |
| 6,079,726 A | 6/2000 | Busby | |
| 6,123,639 A | 9/2000 | Schlumpf | |
| 6,155,585 A | 12/2000 | Busby | |
| 6,173,982 B1 | 1/2001 | Westergard | |
| 6,267,704 B1 | 7/2001 | Patterson | |
| 6,325,739 B1 | 12/2001 | Hino | |
| 6,361,461 B1 | 3/2002 | Pusic | |
| 6,478,710 B1 | 11/2002 | Steuer et al. | |
| 6,533,700 B2 | 3/2003 | Shoge | |

(Continued)

FOREIGN PATENT DOCUMENTS

EP    0159855    7/1989

(Continued)

*Primary Examiner* — Tashiana Adams

(74) *Attorney, Agent, or Firm* — Clause Eight IPS; Michael Catania

(57) ABSTRACT

A mechanism for shifting a chain from one sprocket to another sprocket is disclosed herein. The mechanism preferably includes rotor assembly, a control element and a chain tensioner. The rotor assembly preferably has a conical shaped body with a chain slot having clearance windows and cam surfaces. The control element rotates the rotor assembly to shift the chain from one of the sprockets to another sprocket without lateral movement of the rotor assembly.

19 Claims, 11 Drawing Sheets

U.S. PATENT DOCUMENTS

| | | |
|---|---|---|
| 6,540,244 B1 | 4/2003 | Oda |
| 6,558,288 B2 | 5/2003 | Okochi |
| 6,572,508 B2 | 6/2003 | Shoge |
| 6,607,457 B2 | 8/2003 | Kawakami |
| 6,607,465 B1 | 8/2003 | Shoge |
| 6,641,500 B2 | 11/2003 | Shoge |
| 6,692,400 B2 | 2/2004 | Butz |
| 6,726,587 B2 | 4/2004 | Kawakami |
| 6,757,975 B1 * | 7/2004 | Todd et al. .............. 29/893.33 |
| 6,764,423 B2 | 7/2004 | Lemanski |
| 6,860,171 B1 | 3/2005 | Nanko et al. |
| 6,875,150 B2 | 4/2005 | Matsuo et al. |
| 6,988,973 B2 | 1/2006 | Steuer |
| 7,083,542 B2 | 8/2006 | Itou et al. |
| 7,166,054 B2 | 1/2007 | Urabe |
| 7,192,379 B2 | 3/2007 | Steuer et al. |
| 7,204,169 B2 * | 4/2007 | Mitchell .................... 74/489 |
| 7,472,626 B2 | 1/2009 | Nanko et al. |
| 7,712,566 B2 | 5/2010 | Jordan et al. |
| 2003/0064840 A1 | 4/2003 | Kawakami |
| 2003/0064841 A1 | 4/2003 | Kawakami |
| 2003/0096669 A1 | 5/2003 | Kawakami |
| 2003/0186776 A1 | 10/2003 | Wu |
| 2004/0171454 A1 | 9/2004 | Itou et al. |
| 2004/0200307 A1 | 10/2004 | Mitchell |
| 2007/0032324 A1 * | 2/2007 | Uchiyama et al. .......... 474/140 |
| 2007/0129191 A1 * | 6/2007 | Florczyk .................... 474/144 |
| 2009/0260476 A1 | 10/2009 | Jordan et al. |

FOREIGN PATENT DOCUMENTS

| | | |
|---|---|---|
| EP | 0922630 | 6/2004 |
| EP | 1980484 | 10/2008 |
| EP | 2112062 | 10/2009 |
| EP | 1332958 | 12/2009 |
| WO | WO9946159 | 9/1999 |

* cited by examiner

SPIRAL ROTOR CHAIN SHIFTING SYSTEM

CROSS REFERENCE TO RELATED APPLICATION

The present application claims priority to U.S. Provisional Patent Application No. 61/142,018, filed on Dec. 31, 2008, which is hereby incorporated by reference.

STATEMENT REGARDING FEDERALLY SPONSORED RESEARCH OR DEVELOPMENT

Not Applicable

BACKGROUND OF THE INVENTION

1. Field of the Invention

The present invention is related to bicycles, and more particularly to gear shifting mechanisms for bicycles.

2. Description of the Related Art

The transferring of a drive chain from one sprocket to an adjacent sprocket has been the common practice on bicycles for the last half century. The conventional mechanism for doing the transferring is called a "derailleur." Conventional derailleurs in commercial use today move laterally to transfer the chain laterally from one sprocket to another.

An early example of a derailleur is disclosed in Nagano, U.S. Pat. No. 3,974,707 for a Derailleur For A Bicycle which discloses a derailleur for a bicycle having a fitting member, two linkage members and a movable member, which are all movable with respect to each other. Between two of the members there is a device for positioning cages having chain-guide pulleys mounted on the movable member, whereby the derailleur enables the cages to be properly positioned and kept in the position at each speed-change stage of the bicycle so that an accurate and light speed-change operation may be performed.

Another example is disclosed in Nagano, et al, U.S. Pat. No. 4,241,617 for a Derailleur For A Bicycle which discloses a derailleur for a bicycle adapted to shift a driving chain to a selected one of two or more sprocket wheels by pushing or pulling a push-pull control wire.

Yet another example is Kojima, et al., U.S. Pat. No. 5,518,456 for a Bicycle Derailleur which discloses a bicycle derailleur operable by a control cable to shift a chain between a large gear and a small gear, and includes a parallelogram link mechanism having a base member connectable to a bicycle frame, a support member, and a pair of pivotal links extending between the support member and the base member, with a return spring for biasing the support member in one direction.

Yet another example is Shahana et al., U.S. Pat. No. 7,044,874 for a Bicycle Rear Derailleur which discloses a derailleur that includes a base member for attachment to a bicycle frame and a movable member supporting a chain guide such that the chain guide moves laterally to shift a chain among a plurality of gears. The base member has a laterally inner surface and a laterally outer surface, and it includes a projection extending from one of the laterally inner surface and the laterally outer surface for engaging a corresponding recess in the frame.

It is generally a complex matter to move the chain guiding surfaces or pulleys laterally while maintaining alignment of the guiding surfaces to the chain line for smooth running between shifts. The conventional solution to this problem is to use a precision parallelogram so that lateral movement can be accomplished with substantially pure translation with no rotation.

In the case of the rear derailleur, the precision parallelogram is also burdened with the additional task of supporting a chain tensioner to take up slack in the chain. There is more or less chain slack depending on which front and rear sprockets are selected to produce a drive ratio.

An additional deficiency of a parallelogram derailleur especially the rear derailleur is that the parallelogram needs room to operate. Generally the parallelogram of the rear derailleur swings outboard of the sprockets to which it is guiding the drive chain. This places the parallelogram outside the protective envelope of the chain stays for most of its operation, especially in the smaller or higher drive ratio rear sprockets.

A major problem for city and off road bicycles today is that this rear derailleur is in harm's way, swinging outside the chain stays. Its delicate precision parallelogram is thus easily and frequently damaged. The damage can occur when the bicycle is ridden in a rough environment with tree branches, roots and rocks. The damage can also occur when the bicycle is transported with a group of bicycles in the back of a truck or car. The damage even frequently occurs when a new bicycle is being shipped from the factory to a bicycle shop before it is offered for sale.

These problems are generally due to the awkward exposed location of the rear derailleur.

Another disadvantage of the common rear derailleur is that it requires a precise relationship to the sprockets in order to precisely guide the drive chain to a selected sprocket. But, in spite of this precise requirement, the derailleur is not mounted directly to the rear hub. It is instead bolted to the frame or "derailleur hanger". The derailleur hanger is an element of a bicycle frame that is constantly being damaged due to impact forces transferred to it by the awkwardly located rear derailleur. Every frame designer has a novel way to either strengthen or make the hanger replaceable. These design variations complicate the precise relationship needed between the derailleur and the sprockets. This variation from frame to frame makes it necessary to include a range of motion limit adjustments on the derailleur so that each bicycle can be custom adjusted to restore the required relationship between the derailleur and sprockets. Much care must be taken to align the hanger on a new bicycle or after impact to the derailleur. Hangers often break off and render the whole bicycle frame useless.

BRIEF SUMMARY OF THE INVENTION

In a general description, the present invention is a drive belt/chain shifting mechanism which causes a drive chain to shift laterally from one sprocket to the next due to pushing and shoving or camming going on between the drive chain and the shifting mechanism. The shifting mechanism primarily rotates and is therefore referred to as a rotor. The surprising thing is that the rotor causes the drive chain to move laterally while the rotor itself merely rotates without lateral movement. Therefore the rotor shifting mechanism can do its job of directing the drive chain to one of the sprockets while maintaining an extremely low profile. The rotor preferably takes the shape of a cover or cowling shrouding the sprockets. The shifting "cams" and clearance windows are features of the cowling. The cowling is rotated or "clocked" to the various angular positions that correspond to the various drive sprockets. A handlebar shift actuator is preferably used to control the clocking of the rotor.

A chain tensioner or chain slack manager mechanism that feeds the slack side of the drive chain onto the sprockets on the hub provides the advantage that the trajectory of the drive chain is much more predictable and the clearance windows and camming surfaces can be more precisely positioned to direct the drive chain to the destination drive sprocket and also provide "clearance windows" for quiet running after engaging the destination sprocket.

One aspect of the present invention is a mechanism for shifting a chain from one of a plurality of sprockets mounted on a hub to another of the plurality of sprockets as the sprockets rotate about an axis defined by the hub. The mechanism preferably includes a rotor assembly, a control element and a chain tensioner. The rotor assembly has a body and is disposed over the plurality of sprockets and is rotatably connected to the hub. The body includes a chain slot having a plurality of clearance windows and a plurality of cam surfaces. Each of the plurality of clearance windows corresponds to one of the plurality of sprockets and each of the plurality of cam surfaces is disposed between consecutive clearance windows of the plurality of clearance windows. The control element rotates the rotor assembly to shift the chain from one of the plurality of sprockets to another of the plurality of sprockets. The chain tensioner maintains tension on the chain.

In a preferred embodiment, the control element is a control spool that is integral with the rotor assembly. In a preferred embodiment, the plurality of clearance windows of the chain slot comprises two to six clearance windows. In a preferred embodiment, each clearance window of the plurality of clearance windows of the chain slot is parallel to the other clearance windows of the plurality of clearance windows and each cam surface of the plurality of cam surfaces of the entrance chain slot is angled between consecutive clearance windows of the plurality of clearance windows. In a preferred embodiment, the body of the rotor assembly is a conical shell having a first diameter nearest a hub that is larger than a second diameter farthest from the hub, and the rotor assembly preferably rotates independently of the hub.

An alternative embodiment includes a second chain slot having a plurality of clearance windows and a plurality of cam surfaces, with each of the plurality of clearance windows corresponding to one of the plurality of sprockets and each of the plurality of cam surfaces disposed between consecutive clearance windows of the plurality of clearance windows. The chain can enter through the second chain slot of the first chain slot.

Another aspect of the present invention is a bicycle. The bicycle includes a frame, a handlebar, a control cable, a hub, sprockets, a chain and a shift mechanism. The handlebar is connected to the frame and has an actuator. The control cable is connected to the handlebar actuator at one end. The hub is connected to the frame. The sprockets are mounted on the hub and rotate about an axis defined by the hub. The chain engages at least one of the sprockets. The shift mechanism preferably includes a rotor assembly, a control element and a chain tensioner. The rotor assembly has a body and is disposed over the plurality of sprockets and is connected to the hub. The body includes a chain slot having a plurality of clearance windows and a plurality of cam surfaces. Each of the plurality of clearance windows corresponds to one of the plurality of sprockets and each of the plurality of cam surfaces is disposed between consecutive clearance windows of the plurality of clearance windows. The control element rotates the rotor assembly to shift the chain from one of the plurality of sprockets to another of the plurality of sprockets. The chain tensioner maintains tension on the chain.

In a preferred embodiment, the frame comprises a chain stay and a seat stay, and the hub is connected to the chain stay and the seat stay. In a preferred embodiment, the handlebar actuator is indexed and moves the rotor assembly among a plurality of clocking angles corresponding to each of the plurality of sprockets. In a preferred embodiment, the rotor assembly is connected to the hub by at least one bearing and more preferably a plurality of bearings.

Yet another aspect of the present invention is a method for shifting a chain from one of a plurality of sprockets mounted on a hub to another of the plurality of sprockets as the sprockets rotate about an axis defined by the hub. The method includes actuating a shifter mechanism to move a chain from one of a plurality of sprockets mounted on a hub to another of the plurality of sprockets as the sprockets rotate about an axis defined by the hub. The method also includes moving the chain laterally along an axis defined by the hub while the shifter mechanism remains laterally fixed in order to shift the chain from one of the plurality of sprockets mounted on a hub to another of the plurality of sprockets. The method preferably includes maintaining tension on the chain.

In an embodiment, a shift mechanism is provided for shifting a chain from one sprocket to another. The shift mechanism includes a rotor having formed therein a chain slot having a clearance window corresponding to each one of a plurality of chain sprockets and having shift cam surfaces disposed between each clearance window. The rotor is rotatably mounted to a hub along with the plurality of chain sprockets such that the rotor can rotate about an axis of rotation of the hub. A shift control cable rotates the rotor with respect to an axis to engage a chain with the shift cam surfaces in order to shift the chain from one of the plurality of sprockets to another.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention generally relates to shifting drive ratios by transferring a drive chain from one sprocket to another and alleviates some of the problems associated with the conventional derailleur. The following description focuses primarily on the invention as a replacement for a rear derailleur, but the same principles can be applied to replace a front derailleur. The primary difference between the front and rear derailleur is that the rear derailleur controls the slack side of the chain and the front controls the taut or driving run of chain. The chain tensioner is generally on the slack run and is integral with the rear derailleur. The present invention may be utilized on either the slack or taut run of chain.

In one embodiment, a chain tensioning function is separated from a chain transferring or chain guiding function. Such a separation of the chain tension function from the chain transferring function is convenient when using a single chain ring or multispeed planetary gear with a single chain ring on a pedal spindle. In such an embodiment, the chain ring (planetary or not) is in a fixed position. A chain tensioner 70 is mounted that does not need to move laterally since the chain is not being transferred laterally from one chain ring to another chain ring. A spring biased idler cage with two or three pulleys is used to tension the slack run of the chain proximate and behind the chain ring. Such an arrangement is configured to preferably pay out the running chain from a fixed location to simplify the task of subsequently transferring and guiding the drive chain to the selected rear sprocket.

The chain tensioning function is preferably located proximate and behind the chain ring as far forward as possible to minimize changes in a chain angle as the chain is transferred and guided to the various sprockets on the rear hub.

Figure 1:
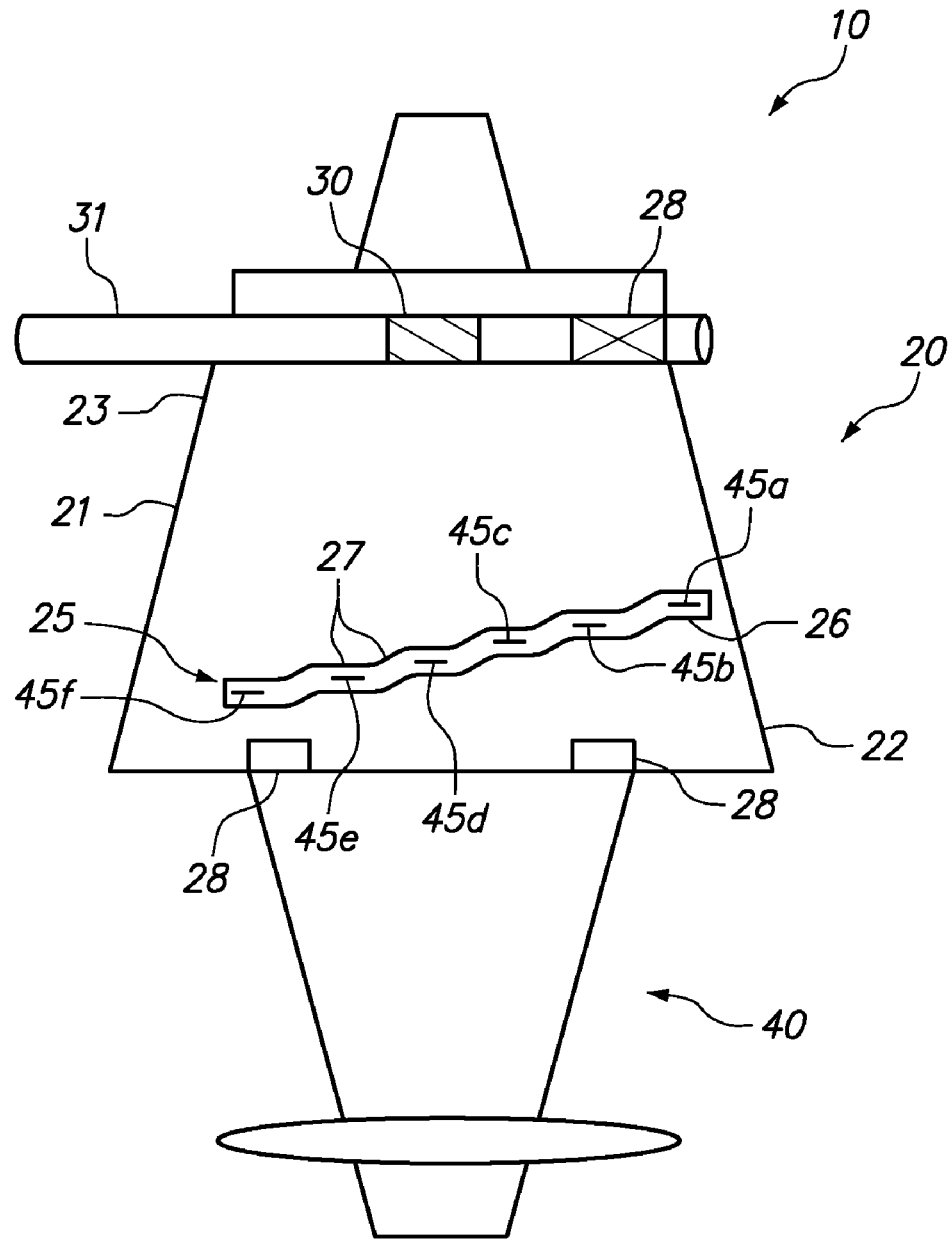
FIG. 1 is a top view of a preferred embodiment of a spiral rotor chain shifting mechanism connected to a hub of a bicycle.
Figure 2:
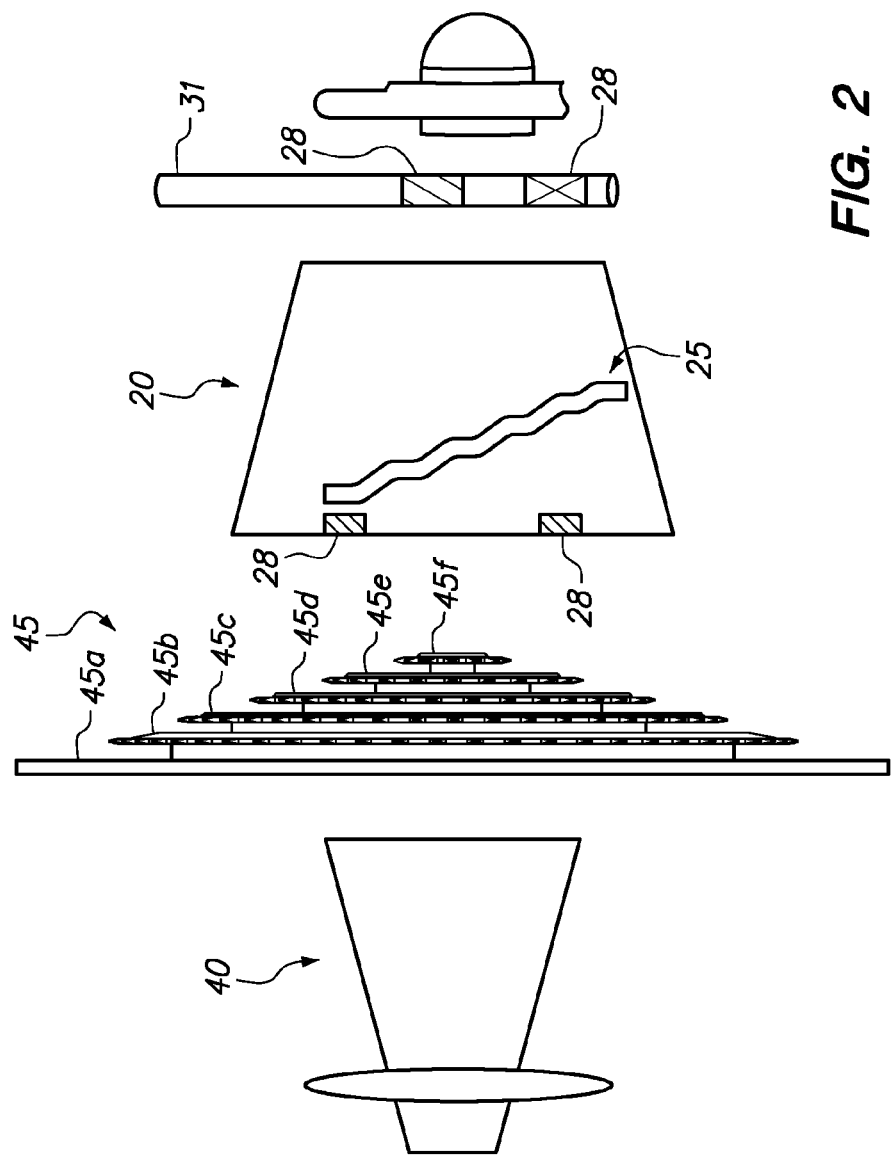
FIG. 2 is an exploded view of a preferred embodiment of a spiral rotor chain shifting mechanism with a hub and sprockets of a bicycle.
Figure 3:
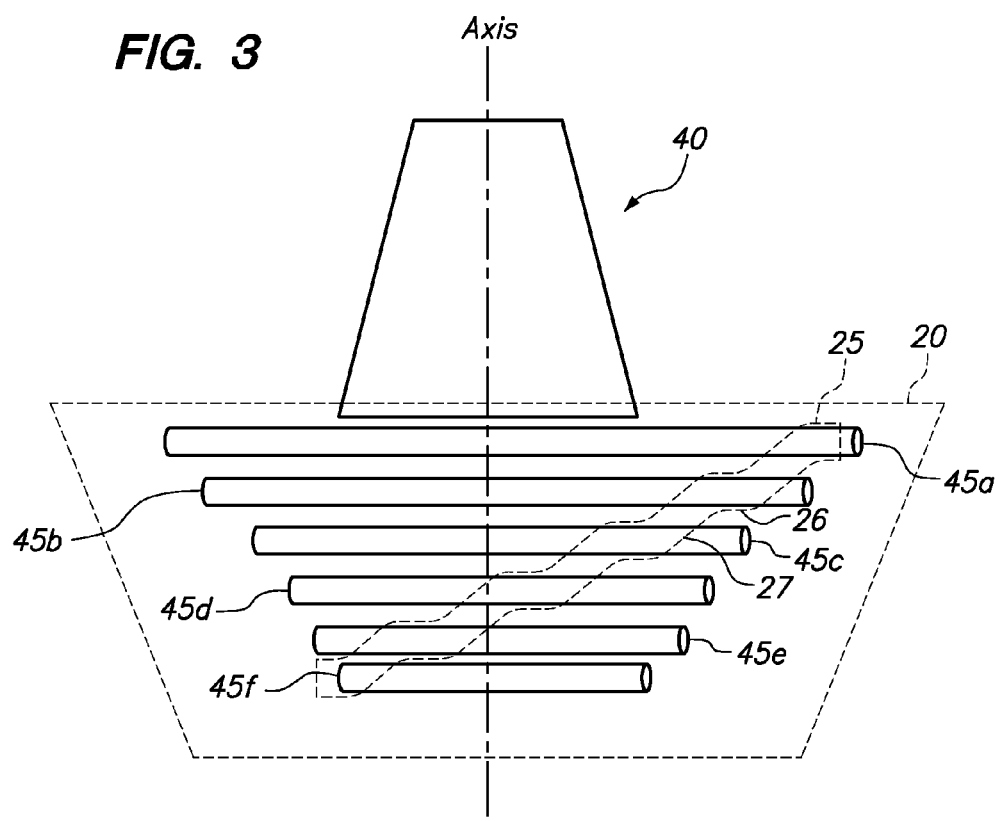
FIG. 3 is a cut-away view of a hub and six sprockets with an overlay of a rotor assembly in dashed lines and a chain slot.

As shown in FIGS. 1-3, an exemplary embodiment of a spiral rotor chain shifting mechanism is generally designated 10. The mechanism 10 manages the chain transferring and guiding function with a simple robust rotor assembly 20 with reduced moving parts. The mechanism 10 transfers a chain 50 laterally from a first sprocket 45 to a second sprocket 45 but does not itself move laterally. As will be seen from the following description, the rotor assembly 20 rotates about the same axis as the sprockets 45, but does not move laterally with the chain 50. Such an arrangement allows the rotor assembly 20 to be extremely compact and to occupy little more space than the sprockets 45 themselves. The rotor assembly 20 is generally positioned within the protective envelope of the frame stays and is less prone to damage.

The rotor assembly 20 preferably has a body 21 conical in shape that has a large diameter nearest a hub end 22 and a small diameter nearest a cable end 23. However, those skilled in the pertinent art will recognize that other shapes may be utilized for the body 21 without departing from the scope and spirit of the present invention. The rotor assembly 20 preferably has a depth of from 3 to 5 centimeters, a large diameter of from 10 to 14 centimeters ("cm") and a small diameter of from 2 cm to 4 cm. The rotor assembly 20 also preferably has a thickness ranging from 1 millimeter ("mm") to 100 mm. However, those skilled in the pertinent art will recognize that the dimensions of the rotor assembly 20 will preferably vary according to the number and size of the sprockets on any particular bicycle.

FIG. 1 shows an overall view of rotor assembly 20. The rotor assembly 20 is preferably a spiral rotor. In a preferred embodiment, the rotor assembly 20 has a conical shell shape that is rotatably supported over the sprockets 45 on at least one bearing 28, and more preferably multiple bearings 28 that are seated on a hub 40. The rotor assembly 20 preferably has a body 21 that is preferably composed of a light-weight material. Such a light-weight material includes light weight metals such as titanium alloys, magnesium alloys, aluminum alloys and the like, and non-metal materials such as plastics and composites. A preferred material is a nylon composite material. The mass of the body 21 preferably ranges from 10 grams to 200 grams.

The rotor assembly 20 preferably rotates independent of the rotation of the hub 40 or sprockets 45. Alternatively, the rotor assembly 20 does not rotate. Common practice is to mount sprockets on bearings with a one-way clutch connection to a hub so that the hub can freewheel when a bicycle is coasting without being pedaled. In contrast, the rotor assembly 20 preferably only rotates when operated by a rider moving a handlebar control actuator 80.

The rotor assembly 20 is preferably a chain guiding device. The rotor assembly 20 rotates only when activated by the rider to clock or rotate to an angle corresponding to a newly selected sprocket 45. Between shifts, the rotor assembly 20 remains at rest with respect to a frame 60. In FIG. 1, a control cable 31 is shown that is keyed to a control spool 30 which is preferably integral with a body 21 of the rotor assembly 20. The rotor assembly 20 rotates in the forward direction when the control cable 31 is pulled by a handlebar actuator 80 on a handlebar 65. In one embodiment, the actuator 80 is indexed and moves the rotor assembly 20 among various clocking angles corresponding to the various sprockets 45.

Each clearance window 26 of the chain slot 25 is laterally wide enough to clear the chain 50 itself plus slight additional clearance for chain angle. A range of widths for each of the clearance windows 26 is preferably 10 mm to 30 mm. The clearance windows 26 do not actually have a top or bottom. The top and bottom simply transition into the shift cam surface 27 for the next clearance window 26. The clearance windows 26 are preferably parallel to each other because the sprockets 45 are parallel to each other. The shift camming action of the cam surface 27 can be anywhere along the chain slot 25 but most particularly the shifting takes place on the angled chain surfaces 27 between each of the clearance windows 26. The rotor assembly 20 must clock to a different angle for each destination sprocket 45. The angular positions are different enough to allow a transitional angled shift cam surface 27 to connect the clearance windows 26. A clocking angle range is preferably 20 to 40 degrees. A most preferred clocking angle is 30 degrees. An enabling control mechanism for this clocking is preferably a handlebar control cable actuator 80 that pulls and unwinds control cable 31 from a spool 30 integral with the rotor assembly 20. There is preferably a biasing return spring 32 tending to rotate the control spool 30 and rotor assembly 20 in the control cable 31 take up direction. As the handlebar actuator 80 pulls and releases the control cable 31 between various predetermined positions, the rotor assembly 20 clocks from one destination sprocket 45 to another destination sprocket 45 causing the drive chain 50 to move to each new destination sprocket 45.

Figure 1A:
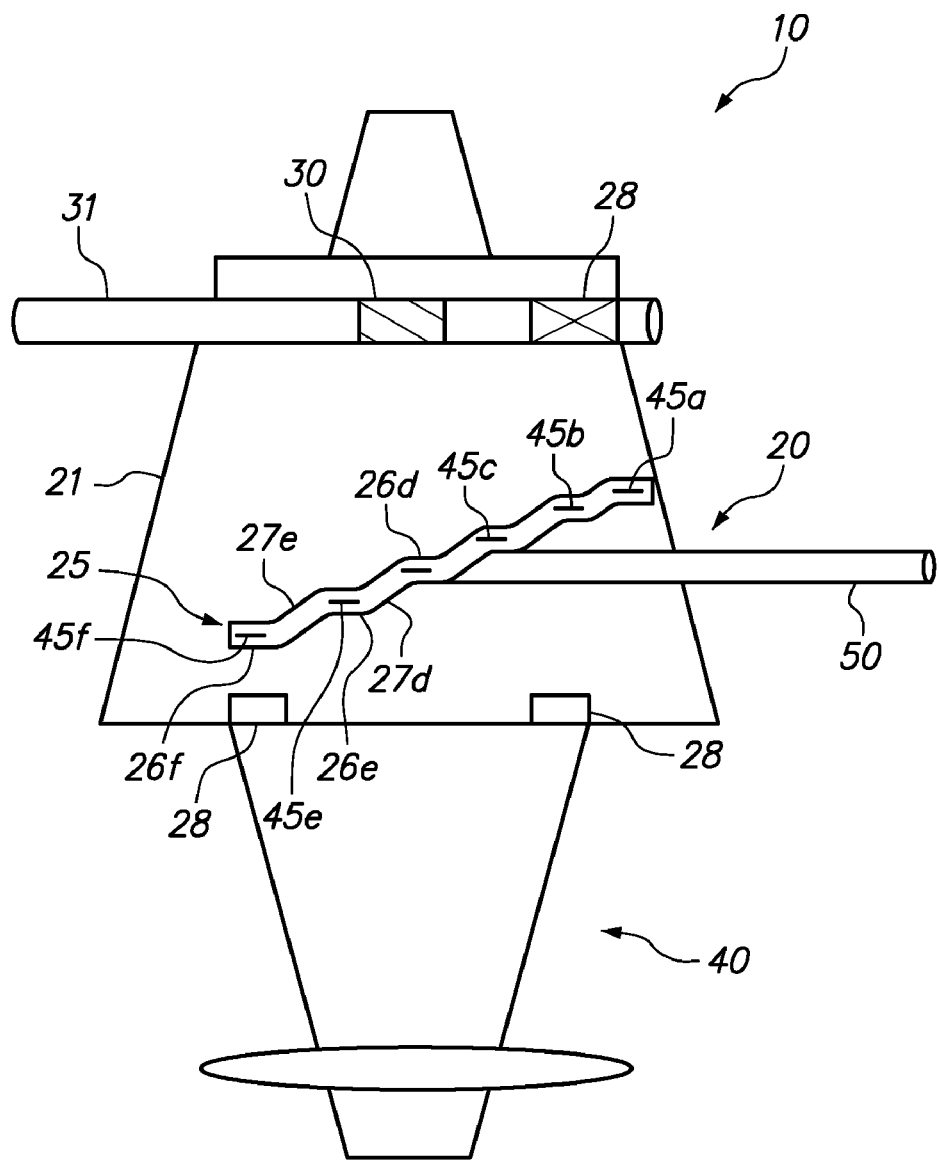
FIG. 1A is a top view of a preferred embodiment of a rotor chain shifting mechanism engaging a drive chain on a sprocket.
Figure 1B:
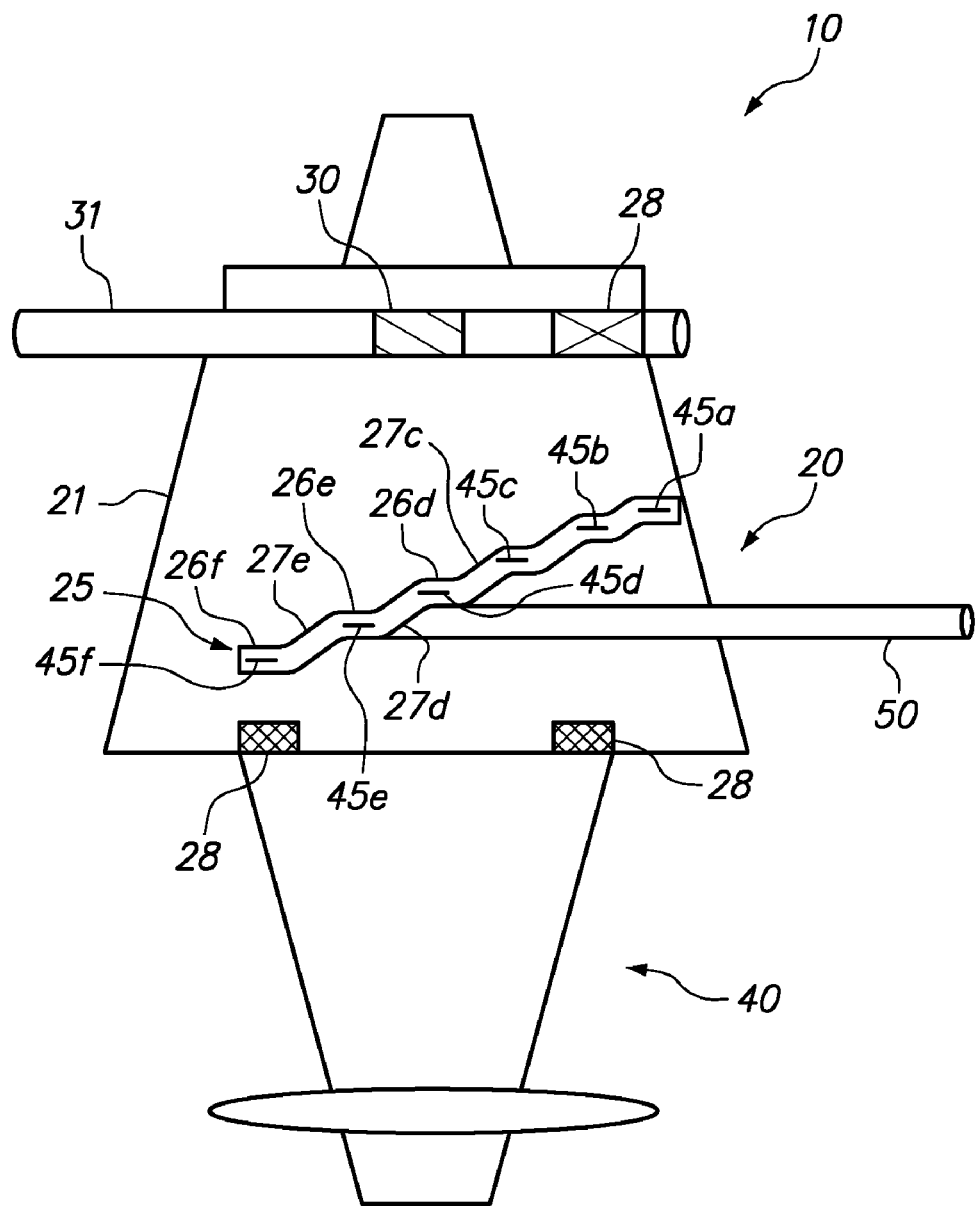
FIG. 1B a top view of a preferred embodiment of a rotor chain shifting mechanism engaging a drive chain on a cam surface of a chain slot to shift the chain from the sprocket engagement of FIG. 1A to an adjacent sprocket without lateral movement of a rotor assembly.
Figure 1C:
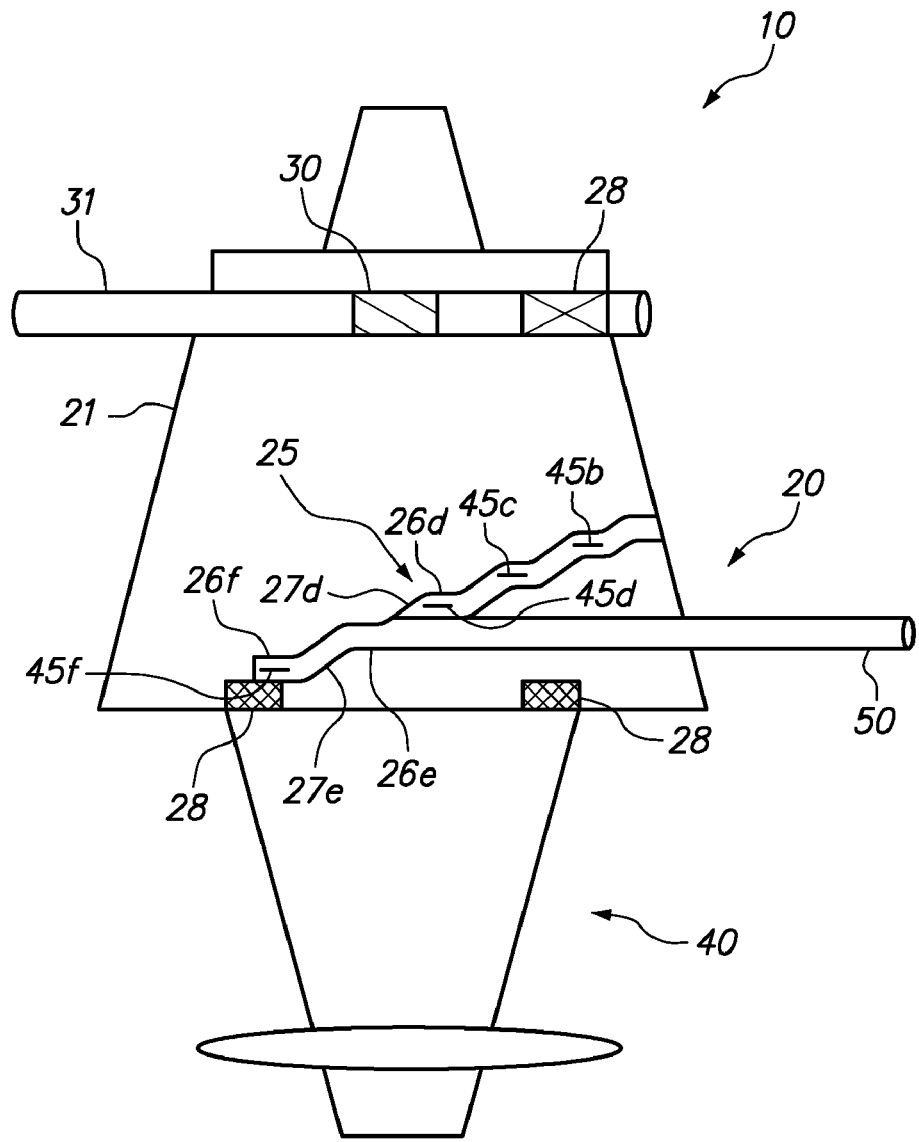
FIG. 1C is a top view of a preferred embodiment of a rotor chain shifting mechanism engaging a drive chain on an adjacent sprocket from the sprocket engagement of FIG. 1A.

As shown in FIG. 1A, a chain 50 is engaged on a fourth sprocket 45*d* of a set of six sprockets 45*a*-45*f* (see FIG. 3). The chain is visible through a clearance window 26*d* of the chain slot 25 of the rotor assembly 20. As shown in FIG. 1B, in order to shift the chain 50 to an adjacent sprocket 45*e*, the rotor assembly 20 is clocked as discussed above, without lateral movement, thereby having the chain 50 engage a cam surface 27*d* of the chain slot 25. As shown in FIG. 1C, the chain 50 is now engaging adjacent sprocket 45e and is visible through clearance window 26e.

Figure 5:
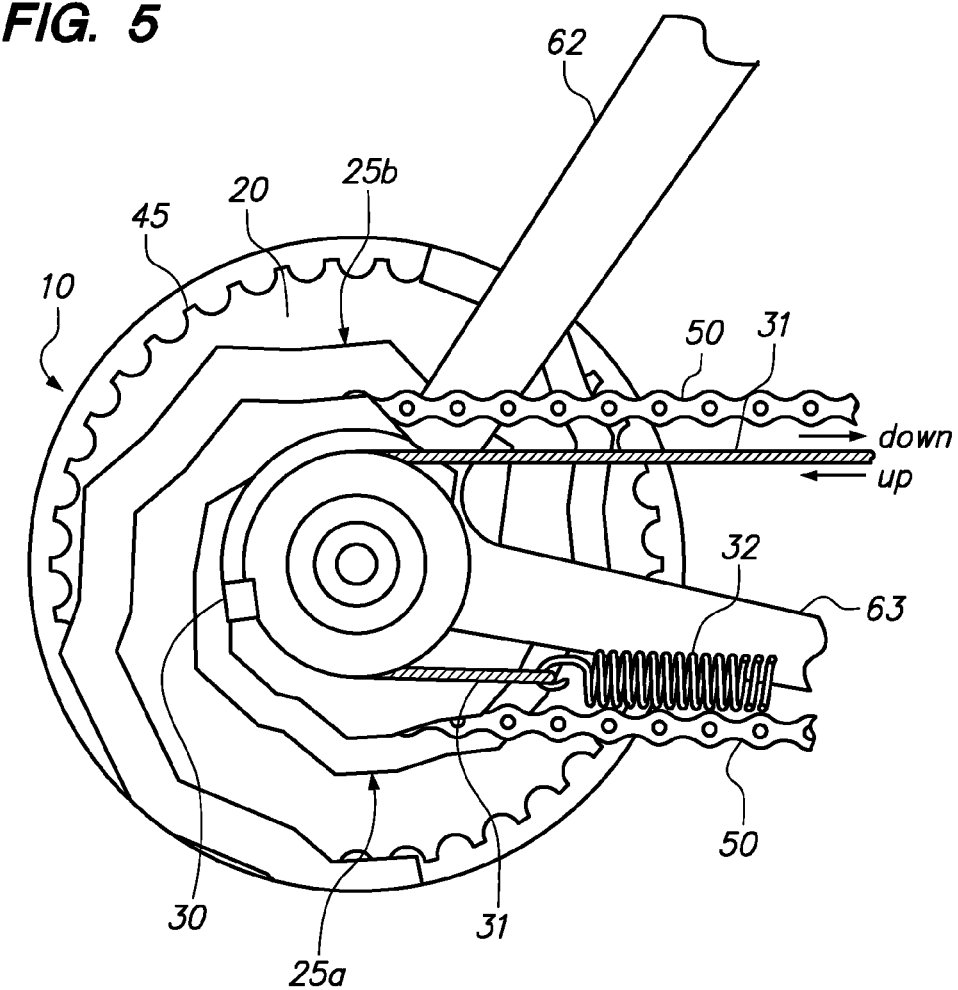
FIG. 5 is a side view of an alternative embodiment a spiral rotor chain shifting mechanism connected to a hub of a bicycle.

FIG. 5 is a side view of an alternative embodiment of the mechanism. FIG. 5 shows a chain exit slot 25b and a chain enter slot 25a. In this embodiment, the two slots 25a and 25b are generally diametrically symmetrical as one corresponds to the chain mesh tangent and the other to the de-mesh tangent. The two chain slots 25a and 25b are nearly parallel, in this embodiment, but those skilled in the pertinent art will recognize that the two chain slots of this embodiment do not need to be parallel or substantially parallel to function in the mechanism 10. As shown in FIG. 5, the control cable 31 may act in an up shift direction or a down shift direction.

FIG. 5 also shows a spring bias member 32 pulling the control cable 31 to keep the control cable 31 taut when the control cable 31 is released from a handlebar actuator 80. Thus, pulling and releasing of the control cable 31 from the handlebar actuator 80 from one indexed position to another index position causes the rotor assembly 20 to clock from one angle to another angle.

Figure 6:
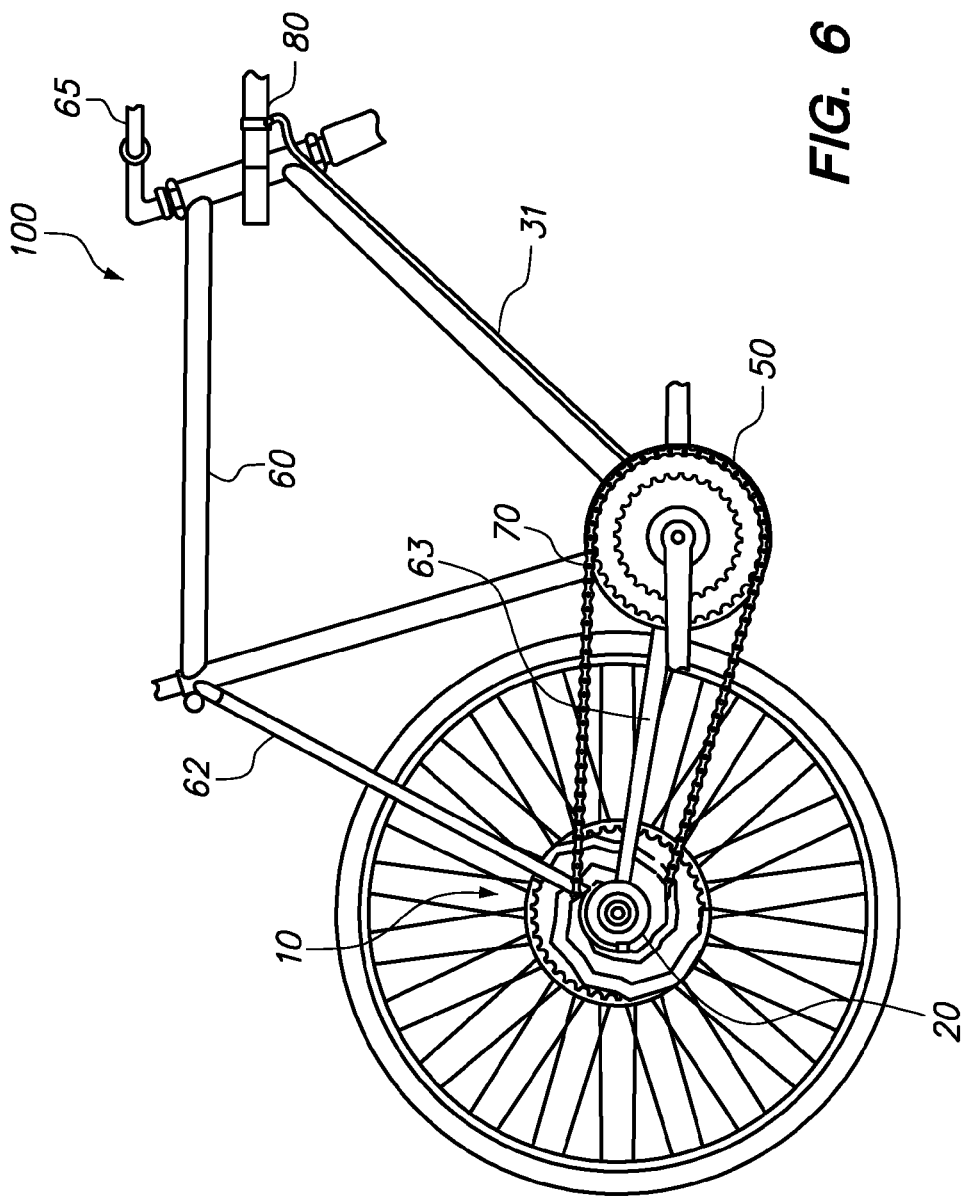
FIG. 6 is a side partial view of a bicycle with a spiral rotor chain shifting mechanism.
Figure 7:
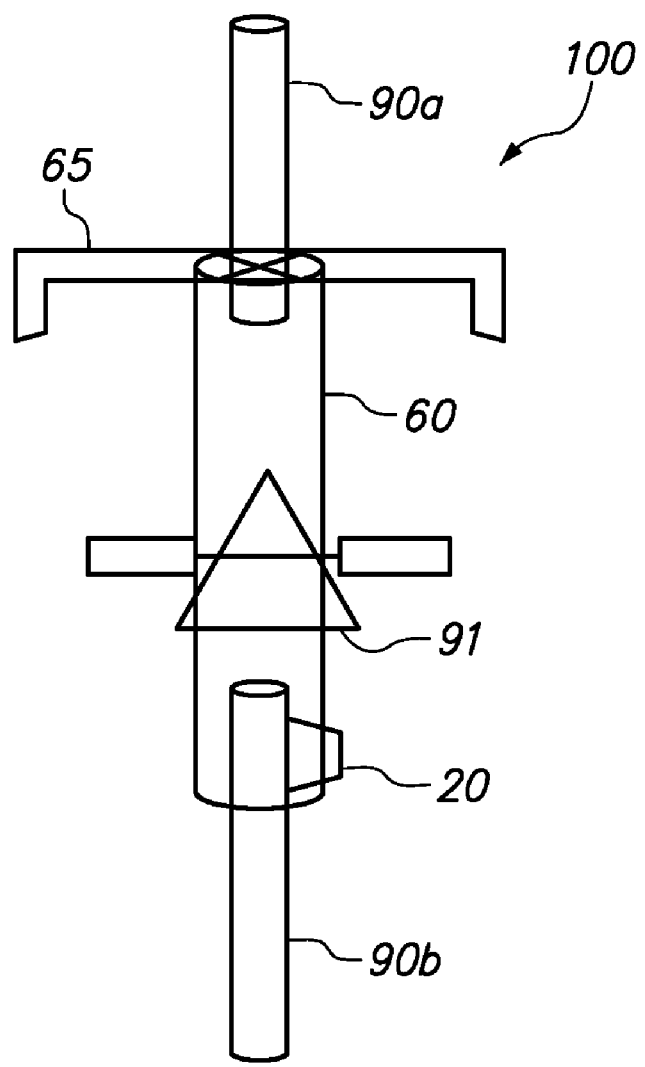
FIG. 7 is a top view of a bicycle with a spiral rotor chain shifting mechanism.

As shown in FIGS. 6 and 7, the control cable 31 is connected to a handlebar actuator 80 attached to a handlebar 65 of a bicycle 100. The frame 60 of the bicycle 100 includes a seat stay 62 and a chain stay 63, and the rotor assembly 20 is preferably positioned within an envelope defined by the seat stay 62 and the chain stay 63.

Figure 8:
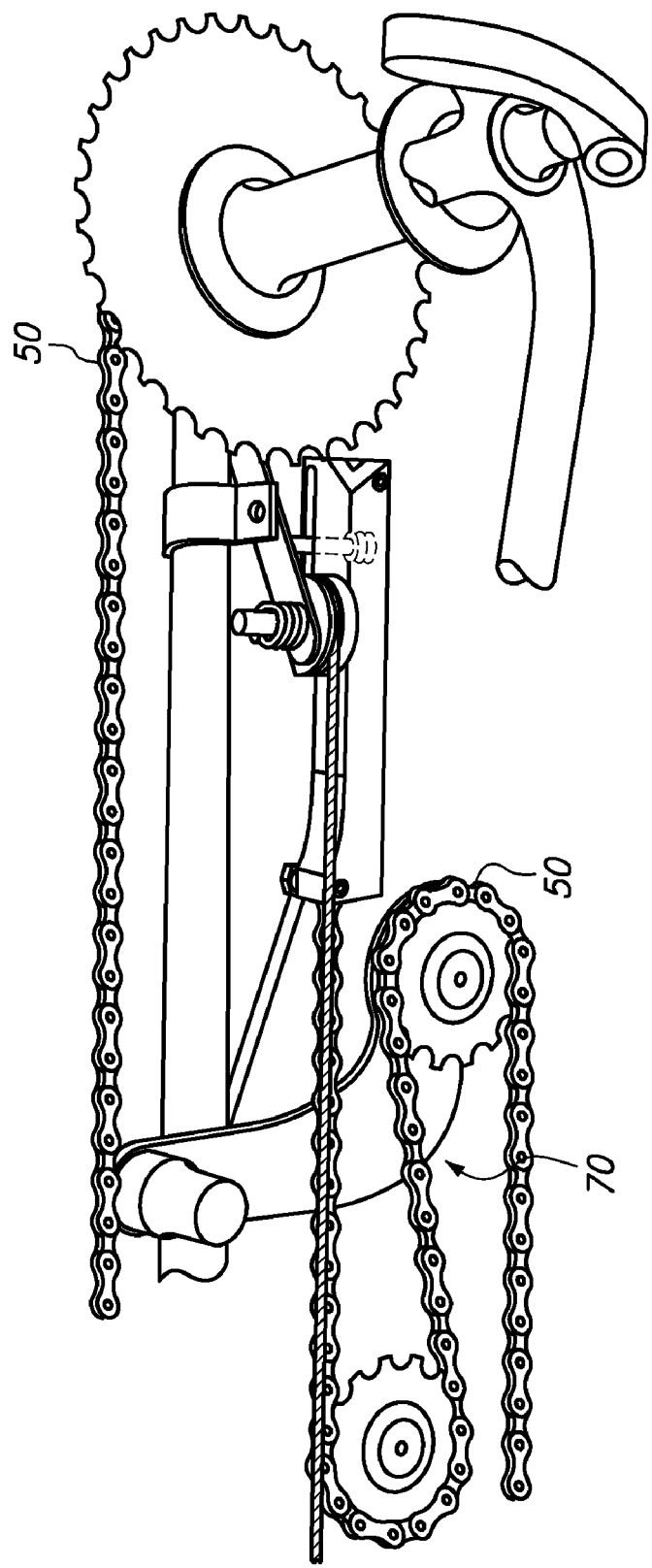
FIG. 8 is an isolated view of a chain tensioner engaging a chain of a bicycle.

As shown in FIG. 8, a chain tensioner 70 is positioned forward of the rotor assembly 20. As mentioned above, the chain tensioning function is separated from the chain transferring function. Those skilled in the pertinent art will recognize that other chain tensioning forms and functions may be utilized without departing from the scope and spirit of the present invention.

Figure 4:
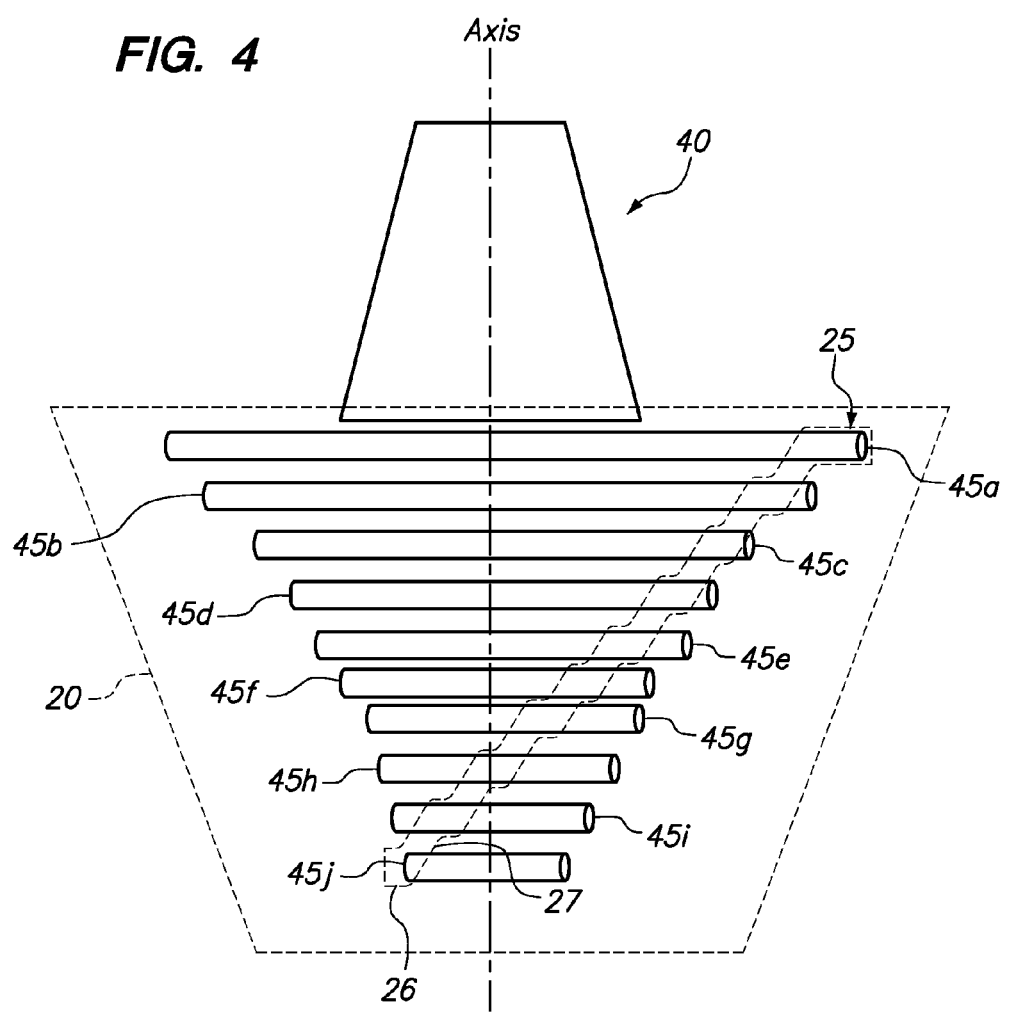
FIG. 4 is a cut-away view of a hub and ten sprockets with an overlay of a rotor assembly in dashed lines and a chain slot.

FIGS. 3 and 4 are overlay top views of the rotor assembly illustrating the relation of the chain slot 25 in the rotor assembly 20 to the each of the sprockets 45a-f in FIG. 3 and 45a-j in FIG. 4. At any particular clocking angle, the rotor assembly 20 positions a clearance window 26 of the chain slot 25 to permit the chain 50 to run on and off of the selected sprocket 45 without contacting the rotor assembly 20 for quiet running. When the operator desires to transfer the chain 50 from one sprocket 45 to an adjacent sprocket 45, the rotor assembly 20 is clocked to the corresponding clocking angle. The chain transfer occurs due to the chain 50 contact against a shift cam surface 27 of the chain slot 25. The contact with the shift cam surface 27 of the chain slot 25 displaces the chain 50 toward the new destination sprocket 45.

Before a shift occurs, the chain 50 runs on and off of the sprocket 45 quietly through a clearance window 26 corresponding to the sprocket 45. When a new sprocket 45 is selected, the rotor assembly 20 rotates so that a shift cam surface 27 displaces the chain 50 toward the new destination sprocket 45. This displacement brings the chain 50 into contact with the destination sprocket 45. Features in the plates of the chain 50 and the teeth of the sprocket 45 cooperate to snag and pull the chain 50 into mesh with a destination sprocket 45. If the rotor assembly 20 is clocked in the clockwise direction, in this embodiment, the chain is transferred to a larger sprocket 45. If the rotor assembly 20 is clocked in the counter clockwise direction, in this embodiment, the chain 50 is transferred to a smaller sprocket 45.

The rotation direction of the rotor assembly 20 with respect to the sprockets 45 may be reversed, but it is generally more difficult to transfer the chain to a larger sprocket 45 (e.g. overcoming chain tension from the tensioner bias) than to a smaller sprocket 45. The more difficult shift is better accomplished with the rotor assembly 20 rotating in the same direction as the sprockets 45. Therefore, the rotation of the sprockets 45 and rotor assembly 20 are moving synergistically to transfer the chain 50 to a larger sprocket 45. The shift to a smaller sprocket 45 is relatively easy and can be accomplished even though the rotor assembly 20 is rotating opposite the sprockets 45.

As soon as the chain 50 transfers to the newly selected sprocket 45, its new run path automatically corresponds to the clearance window 26 corresponding to the currently selected sprocket 45 for quiet running.

Multiple shifts may also be accomplished smoothly by using a pre-select buffer spring in a control linkage as described in U.S. patent application Ser. No. 11/983,311 for a Bicycle Transmission System, filed on Nov. 8, 2007, and said pertinent part hereby incorporated by reference. The purpose of the linkage buffer is to limit the forces of the control cable 31 such that the rotor assembly 20 may move at its own pace securing traction on each sprocket 45 as it moves across the sprocket stack to execute a multiple shift. This way the bike rider will not experience slippage or abruptness during a multiple shift.

FIG. 5 illustrates the chain entrance slot 25a, which is the working surface of the rotor mechanism 10 that causes the chain 50 to shift from one sprocket 45 to another sprocket 45. During forward running of the drive train, the chain entrance slot 25a does the work of shifting and the chain exit slot 25b merely provides clearance. However, the chain exit slot 25b becomes the entrance slot when the bike 100 is rolled backward, and therefore the chain exit slot 25b is preferably configured to shift the chain 50 in case the handlebar actuator 80 has been moved before the bike 100 is rolled backward. The rest of the shell body 21 of the rotor assembly 20 provides a smooth outer housing and also structural support for the working chain entrance slot 25a. The chain entrance slot 25a is preferably supported and precisely positioned relative to the sprockets 45 by the rotor body 21 and inboard and outboard bearings 28 that rotatably support the rotor assembly 20 on the hub 40.

This arrangement shown results in a precise alignment of the rotor assembly 20 to the sprockets 45. In most cases, this arrangement alleviates the need for lateral adjustments as is the case with end range limit screws found on parallelogram derailleurs.

The rotor assembly 20 is preferably mounted directly to the hub 40. The rotor assembly 20 has no direct relationship to the frame 60 and does not require a frame attachment mechanism such as a derailleur hanger. It is thus less susceptible to the peculiarities and misalignments of a derailleur hanger as well as problems associated with damage to the hanger.

The reader should note that descriptive terms in the present application such as "cam slot", "chain slot", "cam surface", "control spool", and the like, are used in reference to an element of one or more embodiments of the invention and such descriptive terms are intended to infer characteristics and similarities between novel elements of this invention and familiar items such as "chain slot", "cam surface", "control spool", and are not intended to mean that novel elements are equal to or limited to "chain slot", "cam surface", "control spool" etc.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. A mechanism for shifting a chain from one of a plurality of sprockets mounted on a hub to another of the plurality of sprockets as the sprockets rotate about an axis defined by the hub, the mechanism comprising:
    a rotor assembly having a body, the rotor assembly disposed over the plurality of sprockets and connected to the hub, the body comprising a chain slot having a plurality of clearance windows and a plurality of cam surfaces, each of the plurality of clearance windows corresponding to one of the plurality of sprockets and each of the plurality of cam surfaces disposed between consecutive clearance windows of the plurality of clearance windows;
    a control element for rotating the rotor assembly to shift the chain from one of the plurality of sprockets to another of the plurality of sprockets; and
    a chain tensioner for maintaining tension on the chain.

2. The mechanism according to claim 1 wherein the control element is a control spool that is integral with the rotor assembly.

3. The mechanism according to claim 1 wherein the plurality of clearance windows of the chain slot comprises two to six clearance windows.

4. The mechanism according to claim 1 further comprising a second chain slot having a plurality of clearance windows and a plurality of cam surfaces, each of the plurality of clearance windows corresponding to one of the plurality of sprockets and each of the plurality of cam surfaces disposed between consecutive clearance windows of the plurality of clearance windows.

5. The mechanism according to claim 1 wherein the body of the rotor assembly is a conical shell having a first diameter nearest a hub that is larger than a second diameter farthest from the hub.

6. The mechanism according to claim 4 wherein the chain enters through the second chain slot.

7. The mechanism according to claim 1 wherein each clearance window of the plurality of clearance windows of the chain slot is parallel to the other clearance windows of the plurality of clearance windows and each cam surface of the plurality of cam surfaces of the entrance chain slot is angled between consecutive clearance windows of the plurality of clearance windows.

8. The mechanism according to claim 4 wherein each clearance window of the plurality of clearance windows of the second chain slot is parallel to the other clearance windows of the plurality of clearance windows and each cam surface of the plurality of cam surfaces of the exit chain slot is angled between consecutive clearance windows of the plurality of clearance windows.

9. The mechanism according to claim 1 wherein the rotor assembly rotates independent of the hub rotation or the rotation of the plurality of sprockets.

10. A bicycle comprising:
    a frame;
    a handlebar connected to the frame, the handlebar having a handlebar actuator;
    a control cable connected at one end to the handlebar actuator;
    a hub connected to the frame;
    a plurality of sprockets mounted on the hub and rotating about an axis defined by the hub;
    a chain engaging at least one of the plurality of sprockets;
    a shift mechanism comprising
        a rotor assembly having a body, the rotor assembly disposed over the plurality of sprockets and connected to the hub, the body comprising a chain slot having a plurality of clearance windows and a plurality of cam surfaces, each of the plurality of clearance windows corresponding to one of the plurality of sprockets and each of the plurality of cam surfaces disposed between consecutive clearance windows of the plurality of clearance windows,
        a control spool for rotating the rotor assembly to shift the chain from one of the plurality of sprockets to another of the plurality of sprockets, the control spool connected to the control cable at another end of the control cable, and
        a chain tensioner for maintaining tension on the chain.

11. The bicycle according to claim 10 wherein the frame further comprises a chain stay and a seat stay, and wherein the hub is connected to the chain stay and the seat stay.

12. The bicycle according to claim 10 wherein the handlebar actuator is indexed and moves the rotor assembly among a plurality of clocking angles corresponding to each of the plurality of sprockets.

13. The bicycle according to claim 10 wherein the rotor assembly is connected to the hub by at least one bearing.

14. The bicycle according to claim 10 wherein each clearance window of the plurality of clearance windows of the chain slot is parallel to the other clearance windows of the plurality of clearance windows and each cam surface of the plurality of cam surfaces of the chain slot is angled between consecutive clearance windows of the plurality of clearance windows.

15. The bicycle according to claim 10 wherein the rotor assembly further comprises a second chain slot having a plurality of clearance windows and a plurality of cam surfaces, each of the plurality of clearance windows corresponding to one of the plurality of sprockets and each of the plurality of cam surfaces disposed between consecutive clearance windows of the plurality of clearance windows.

16. The bicycle according to claim 10 wherein the rotor assembly rotates independent of the hub rotation or the rotation of the plurality of sprockets.

17. The bicycle according to claim 10 wherein the plurality of clearance windows of the chain slot comprises two to ten clearance windows.

18. The bicycle according to claim 10 wherein the body of the rotor assembly is composed of a carbon reinforced nylon material.

19. The bicycle according to claim 10 wherein the body of the rotor assembly is a conical shell having a first diameter nearest a hub that is larger than a second diameter farthest from the hub.

* * * * *